(12) United States Patent
Kowatari et al.

(10) Patent No.: US 7,219,497 B2
(45) Date of Patent: May 22, 2007

(54) HYBRID CAR AND CONTROL METHOD OF THE SAME

(75) Inventors: Takehiko Kowatari, Kashiwa (JP); Shinya Imura, Toride (JP); Norkazu Matsuzaki, Mito (JP); Shin Fujiwara, Naka (JP); Tatsuyuki Yamamoto, Mito (JP); Daisuke Yamamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 11/076,246

(22) Filed: Mar. 10, 2005

(65) Prior Publication Data

US 2006/0090466 A1 May 4, 2006

(30) Foreign Application Priority Data

Nov. 2, 2004 (JP) ............................. 2004-318660

(51) Int. Cl.
| | |
|---|---|
| F02B 33/44 | (2006.01) |
| F02B 37/10 | (2006.01) |
| B60K 1/00 | (2006.01) |
| B60K 6/00 | (2006.01) |
| B60K 8/00 | (2006.01) |
| B60K 17/04 | (2006.01) |
| B60L 8/00 | (2006.01) |
| B60L 11/00 | (2006.01) |
| B60L 11/14 | (2006.01) |
| B60W 20/00 | (2006.01) |
| B60W 10/08 | (2006.01) |
| B60W 10/30 | (2006.01) |

(52) U.S. Cl. ...................... 60/608; 180/65.2; 180/65.3; 903/906; 903/927; 903/942; 701/22

(58) Field of Classification Search .......... 60/606–609; 180/65.1, 65.2, 65.3, 65.4, 65.5, 65.6, 65.7, 180/65.8; 903/906, 907, 919, 922, 924, 927, 903/930, 942; 701/22
See application file for complete search history.

(56) References Cited

U.S. PATENT DOCUMENTS 4,756,377 A * 7/1988 Kawamura et al. ........... 60/608

(Continued)

FOREIGN PATENT DOCUMENTS

DE 10139526 A1 * 2/2003 ................. 903/906

(Continued)

OTHER PUBLICATIONS

European Search Report dated Jul. 18, 2006 (Three (3) pages).

*Primary Examiner*—Thai-Ba Trieu
(74) *Attorney, Agent, or Firm*—Crowell & Moring LLP

(57) ABSTRACT

A hybrid car capable of stably ensuring the bad road running property, obtaining large acceleration in a satisfactory road surface state, and simultaneously when no large acceleration is required, running with fuel consumption kept unchanged is provided. The hybrid car is composed of an engine 1 for driving either of front wheels 2 and rear wheels 8, a generator 10 driven by the engine, a wheel driving motor 14 for driving engine non-driven wheels by power of the generator, a supercharger driving motor 1b for driving a supercharger 1a by the generator, a power distributor 12 adjusting power quantity for distributing the power from the generator to the supercharger motor and wheel driving motor, and a controller 7 for inputting information of wheel speed sensors 3a and 3b and controlling power distribution of the distributor.

10 Claims, 8 Drawing Sheets

U.S. PATENT DOCUMENTS

| | | | |
|---|---|---|---|
| 4,774,811 A * | 10/1988 | Kawamura | 60/608 |
| 5,881,559 A * | 3/1999 | Kawamura | 60/608 |
| 6,209,672 B1 * | 4/2001 | Severinsky | 180/65.2 |
| 6,338,391 B1 * | 1/2002 | Severinsky et al. | 180/65.2 |
| 6,554,088 B2 * | 4/2003 | Severinsky et al. | 180/65.2 |
| 6,840,045 B2 * | 1/2005 | Kusase | 903/906 |
| 7,076,954 B1 * | 7/2006 | Sopko et al. | 60/608 |
| 7,104,347 B2 * | 9/2006 | Severinsky et al. | 180/65.2 |
| 2005/0143878 A1 * | 6/2005 | Park et al. | 180/65.3 |
| 2005/0228553 A1 * | 10/2005 | Tryon | 701/22 |
| 2006/0030979 A1 * | 2/2006 | Kuang et al. | 701/22 |
| 2006/0166784 A1 * | 7/2006 | Tabata et al. | 477/37 |

FOREIGN PATENT DOCUMENTS

| | | | |
|---|---|---|---|
| JP | 62093423 A * | 4/1987 | 60/608 |
| JP | HEI 07-231508 | 8/1995 | |
| JP | 2003-301725 | 10/2003 | |
| JP | 2004076687 A * | 3/2004 | 903/927 |

* cited by examiner

HYBRID CAR AND CONTROL METHOD OF THE SAME

BACKGROUND OF THE INVENTION

The present invention relates to a hybrid car for driving either of front and rear wheels by an engine and driving the other wheels by a motor.

Patent Document 1 (Japanese Application Patent Laid-open Publication No. Hei 07-231508) describes a four-wheel driving device for converting power to electrical energy using an engine as a power source, driving a motor by the electrical energy, thereby driving either of front and rear wheels.

Patent Document 2 (Japanese Application Patent Laid-open Publication No. 2003-301725) discloses an invention for operating an exhaust turbo-rotary machine as a motor by generated power of a rotary machine connected to an engine power shaft, assisting turbo-supercharging, thereby increasing torque of the engine.

The driving device for a hybrid vehicle disclosed in Patent Document 1 is said to be easily mountable due to a small battery. Such a device is considered to be suitable especially for a small car having a limited space.

On the other hand, a small car generally loads a small engine, and the output of an engine, which can be used for power generation, is limited, so that motor output for sufficiently driving wheels can be hardly obtained, and there is the possibility that the acceleration and running property on a bad road such as a frozen road or a muddy road, which is required by four-wheel drive, cannot be obtained sufficiently.

Moreover, particularly when supplying power of a generator directly to the motor, the efficiency of converting the mechanical energy from the engine to electrical energy by the generator and furthermore the efficiency of converting the electrical energy to the mechanical energy by the motor are concerned with it, so that a problem arises that the efficiency as a whole is reduced and the necessary output of the motor can be hardly obtained.

Therefore, it may be considered to temporarily supply power to the motor by using a battery. However, the stored electricity quantity of the battery is limited and there is the possibility that the acceleration and running property on a bad road cannot be maintained for many hours.

Further, since the efficiency is low, when driving a wheel driving motor in a road surface state requiring no four-wheel drive, there is the possibility of increasing fuel consumption.

On the other hand, as disclosed in Patent Document 2, when driving a supercharger by the motor and increasing the torque of the engine, the torque for rotating the wheels is increased.

At this time, in a satisfactory road surface state, the starting acceleration property is improved, while on a bad road, a slip of the wheels is caused inversely and the vehicle enters a state hard to drive.

Further, although the engine torque is increased, fuel is consumed in correspondence to it, so that a problem arises that fuel consumption is increased.

SUMMARY OF THE INVENTION

Figure 1:
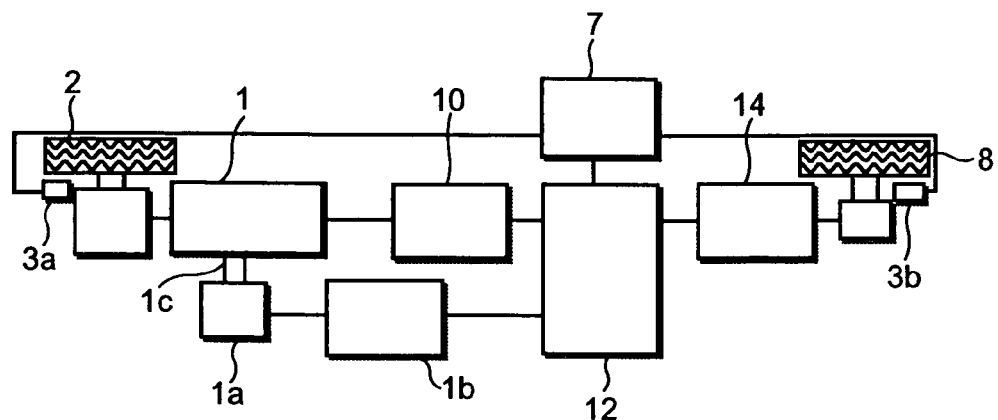
FIG. 1 is a drawing showing a system configuration example of the hybrid car of the present invention.

The first object of the present invention is to provide a hybrid vehicle capable of obtaining large acceleration in a satisfactory road surface state while stably ensuring the bad road running property and simultaneously in a case requiring no large acceleration, running with the fuel consumption kept unchanged.

Meanwhile, when the power load of the generator is changed, the mechanical load (torque) of the generator is changed. When power is distributed to the wheel driving motor and supercharger driving motor from one generator as in the present invention, power is distributed to two motors having different electric characteristics.

When power is supplied alternately to the two motors, the torque of the generator is changed, and not only unpleasant vibration is generated as a torque change of the engine but also vibration of the mechanical elements connecting the generator and engine is caused, and the durability is deteriorated.

Therefore, the second object of the present invention is to provide a method for accomplishing the first object and reducing vibration and noise generated from the generator and engine.

Further, the third object of the present invention is to provide a power distribution method by a distributor for accomplishing the first object.

To accomplish the first object, the hybrid car of the present invention running by driving either of front wheels and rear wheels and a generator by an engine, driving a wheel driving motor by power of the generator, and driving wheels not driven by the engine controls distribution amounts according to the running state when distributing the power generated by the generator to a supercharger motor for driving a supercharger installed in an air intake pipe of the engine and the wheel driving motor.

More concretely, the hybrid car includes the engine for driving either of the front wheels and rear wheels, the generator driven by the engine, the wheel driving motor for receiving the power generated by the generator and driving the wheels (referred to as engine non-driven wheels) not driven by the engine, the supercharger installed in the air intake pipe of the engine, the supercharger motor for receiving the power generated by the generator and driving the supercharger, and the power distributor for distributing the power from the generator to the supercharger motor and wheel driving motor.

To accomplish the second object, the control method for the power distributor of the present invention switches the power faster than the response speed of a machine input change for a power load change with time of the generator.

To accomplish the third object, the control method for the power distributor of the present invention adjusts power distribution amounts to the supercharger motor and wheel driving motor by a switching operation of a car driver. Concretely, when the rotational speed of the wheels (referred to as engine driven wheels) driven by the engine exceeds the rotational speed of the engine non-driven wheels, the power distribution to the wheel driving motor is preferably increased.

Or, when the rotational speed of the wheels (referred to as motor driven wheels) driven by the wheel driving motor exceeds the rotational speed of the engine driven wheels, the control method is preferably a control method for a power distributor characterized in that the power distribution to the supercharger motor is increased.

DESCRIPTION OF THE INVENTION

Hereinafter, an embodiment relating to the present invention will be explained. FIG. 1 shows a system configuration example of the hybrid car relating to the present invention.

The vehicle includes an engine 1 for driving either of front wheels 2 and rear wheels 8, a generator 10 driven by the engine 1, a wheel driving motor 14 for driving wheels (referred to as engine non-driven wheels) not driven by the engine 1 upon receipt of power generated by the generator 10, a supercharger 1a installed in an air intake pipe of the engine 1, a supercharger driving motor 1b for driving the supercharger 1a upon receipt of the power generated by the generator 10, and a power distributor 12 for distributing the power from the generator 10 to the supercharger motor 1b and the wheel driving motor 14 and adjusting the distributed power quantities.

The vehicle includes further wheel speed sensors 3a and 3b for detecting the rotation of each of wheels (referred to as engine driven wheels) driven by the engine 1 and wheels (referred to as motor driven wheels) driven by the motor, and a controller 7 for inputting information of the wheel speed sensors 3a and 3b and controlling the power distribution of the distributor 12.

Figure 2:
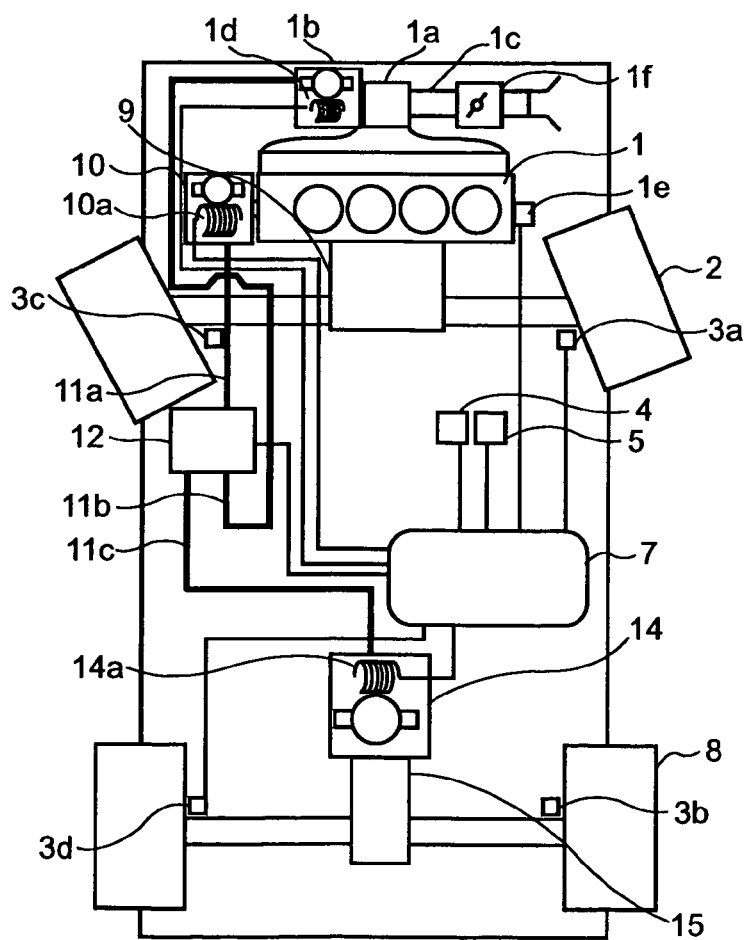
FIG. 2 is a drawing showing the system configuration in detail.

The system configuration will be explained in detail by referring to FIG. 2. For simplicity of explanation, hereinafter, it is assumed to drive the front wheels 2 by the engine 1 and drive the rear wheels 8 by the wheel driving motor 5. However, for practical use, it is not questionable to interchange the front and rear wheels.

The output of the engine 1 is transferred to the front wheels 2 via a transmission 9 having a built-in torque converter. The output of the wheel driving motor 14 is transferred to the rear wheels 8 via a differential gear 15 having a built-in clutch. The generator 10, the wheel driving motor 14, and the supercharger driving motor 1b are electrically connected by power lines 11a, 11b, and 11c via the power distributor 12.

The generator 10 is driven by the engine 1 via a speeding-up pulley mechanism not shown in the drawing. The generated power can be changed by the field current flowing through a generator field coil 10a.

The controller 7, to control the generated power, adjust the field current on the basis of the information of the current flowing through the power line 11a from a current sensor not shown in the drawing. Therefore, there is no need to arrange a particular circuit on the output side of the generator, thus lightweight can be realized.

In the wheel driving motor 14 and the su percharger driving motor 1b, the currents of the respective built-in field coils 14a and 1d are controlled by the controller 7, so that the torque constant can be changed, and desired torque can be obtained, and additionally the power can be prevented from a reverse current to the generator by the counter electromotive force generated by the respective motors, and the generator can be prevented from burning.

The controller 7 controls an electronic control throttle 1f for adjusting the intake air flow rate which is arranged in an air intake pipe 1c of the engine 1, thereby controls the output of the engine. Further, the controller 7 monitors the engine speed using a signal from a rotational speed sensor 1e attached to the engine.

As an acceleration request detection means for detecting an acceleration request to a vehicle, an accelerator pedal sensor 5 for detecting the stepping depth on the accelerator of a driver is installed and a detection signal thereof is sent to the controller 7.

To detect the rotational speeds of the wheels at the time of acceleration of the vehicle, the wheel speed sensors 3a to 3d are installed on the respective wheels and signals thereof are sent to the controller 7. Further, to the controller 7, a signal indicating the status of a switch 4 used to select the power distributor control operation by the driver is sent.

Figure 3:
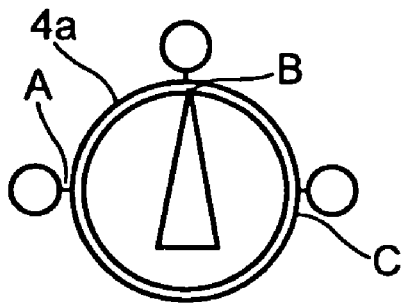
FIG. 3 is a drawing showing the switch 4 in detail.

FIG. 3 shows the switch 4 in detail. FIG. 3A is a front view of the switch and the driver rotates a knob 4a, thereby selects the control method for the power distributor.

When the position A is selected, the fuel consumption saving priority mode is selected, and when the position B is selected, the high μ road acceleration priority mode giving priority to the acceleration during running on a high μ road is selected, and when the position C is selected, the low μ road acceleration and running property priority mode giving priority to the acceleration and running property on a low μ road is selected.

The control methods selectable by one switch are put together like this, so that the selection is simple and the selected control method can be easily confirmed.

Figure 4:
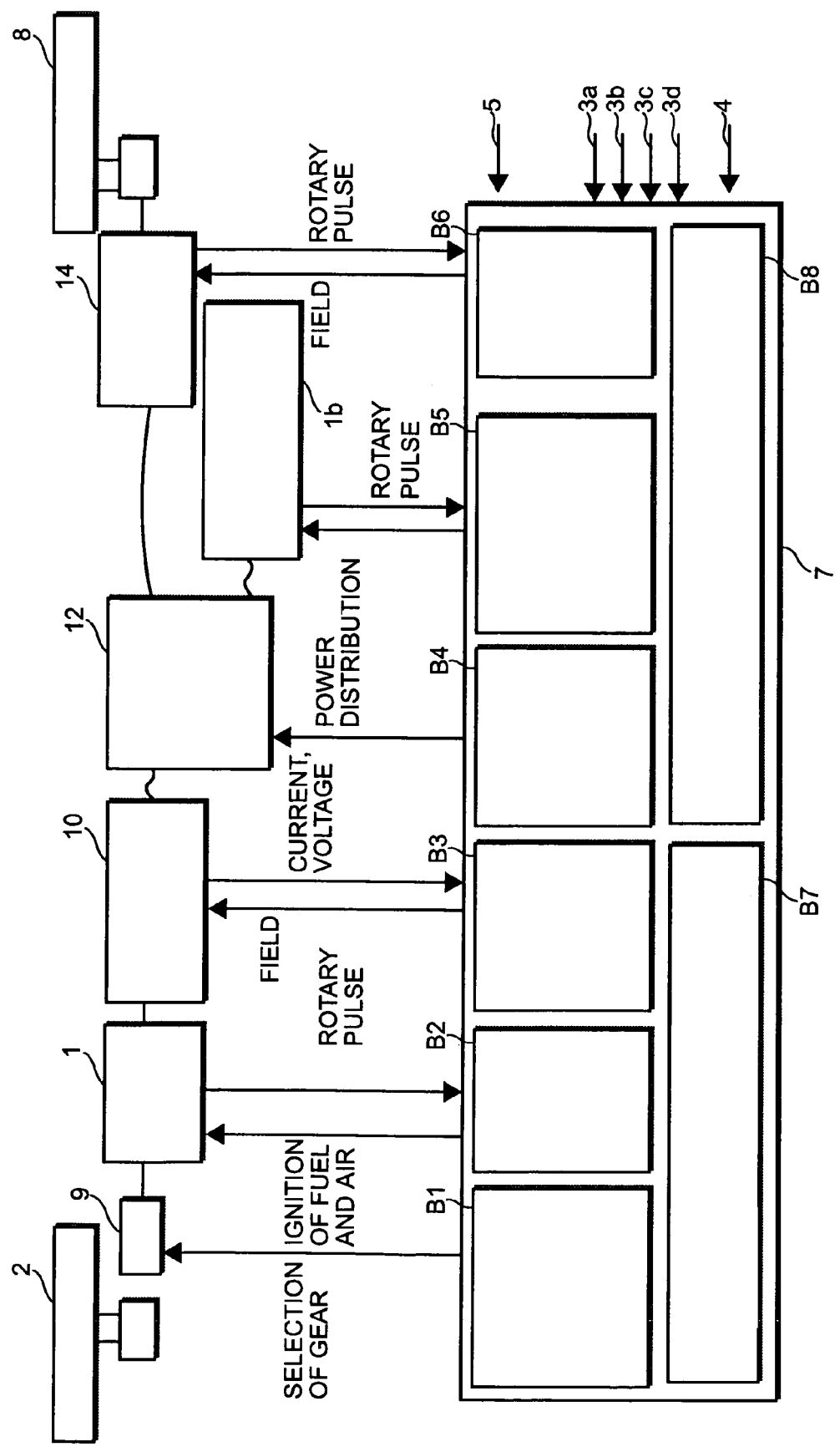
FIG. 4 is a drawing showing the function blocks of the controller 7.

FIG. 4 shows a function block diagram of the controller 7. A driver request judgment block B8 reads signals (information) from the selection switch 4 and the accelerator pedal sensor 5 and calculates drive torque requested by the driver.

A vehicle driving method decision block B7, on the basis of information from the driver request judgment block B8 and information of the wheel speed sensor 3, calculates the drive torques which are targets of the front and rear wheels, synthesizes them with information of the gear ratio from a transmission control block B1, information of the engine speed and torque from an engine output control block B2, information of the input torque and output power of the generator 10 from a generator output control block B3, information of power distribution to the motors 1b and 14 from a distributor control block B4, information of the rotational speed of the supercharger 1a from a supercharger driving motor control block B5, and information of the rotational speed and torque of the wheel driving motor 14 from a wheel driving motor control block B6, and transfers instruction values to the blocks B1 to B6.

The transmission control block B1, on the basis of the instruction, selects the gear ratio and controls the lockup of the automatic transmission.

The engine output control block B2, so as to conform to the instruction value, controls the fuel feed amount by a fuel injector not shown in the drawing and also controls the intake air amount using the electronic control throttle 1f and the ignition timing by an igniting device not shown in the drawing.

The generator control block B3, using information of a current sensor and a voltage sensor which are not shown in the drawing, adjusts the field current of the field coil 10a of the generator 10 along the target output.

The distributor control block B4, to realize the decided power distribution, controls the switching operation on the basis of information of a current sensor and a voltage sensor not shown in the drawing which are installed between the power distributor 12 and each motor.

The supercharger driving motor control block B5 and the wheel driving motor block B6 detect the rotational speed of each motor by a rotational speed sensor not shown in the drawing and on the basis of the detected values, control the currents of the field coils 1d and 14a. Concretely, the blocks control the current using the PWM (pulse width modulation) by turning the voltage on or off.

Figure 5:
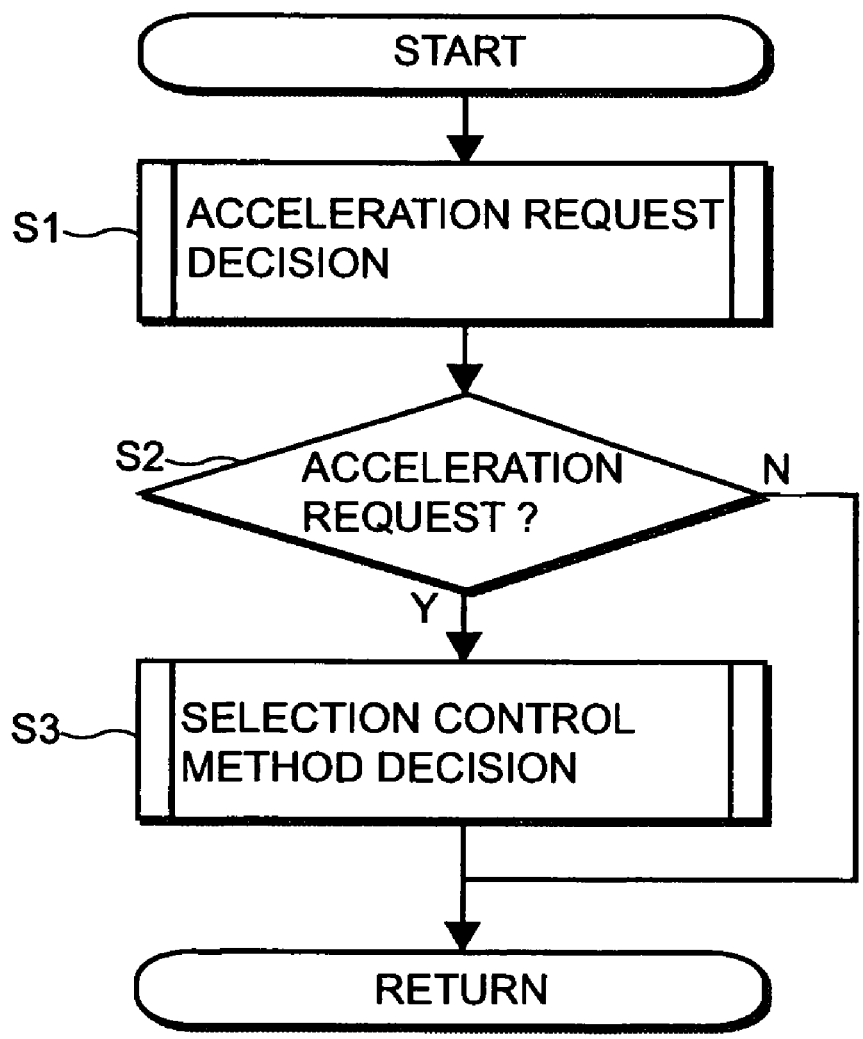
FIG. 5 is a flow chart showing a method of deciding whether or not to control the supercharger driving motor and wheel driving motor.

The control flow will be explained by referring to FIGS. 5 to 7. FIG. 5 shows the flow of decision of whether or not to control the supercharger driving motor 1b and the wheel driving motor 14 and when the engine 1 is started by the driver request judgment block B8, the control is executed repeatedly.

At Step S1, when the accelerator pedal is stepped on the basis of a signal from the accelerator pedal sensor 5, it is assumed that an acceleration request is presented and the acceleration request is decided.

At Step S2, when the acceleration request is presented on the basis of the acceleration request decision, the process goes to Step S3, and when no acceleration request is presented, the process goes to Return.

At Step S3, the position of the switch 4 is read and the control mode according to the position is executed by the wheel driving method decision block B7.

When the switch 4 is set at the position A and the fuel consumption priority mode is selected, to avoid a reduction in the efficiency due to driving the supercharger driving motor 1b and the wheel driving motor 14 and fuel consumption due to an increase in the engine torque, the controller 7 controls so as to avoid distribution of the power from the power distributor 12 to the supercharger driving motor 1b and the wheel driving motor 14.

Figure 6:
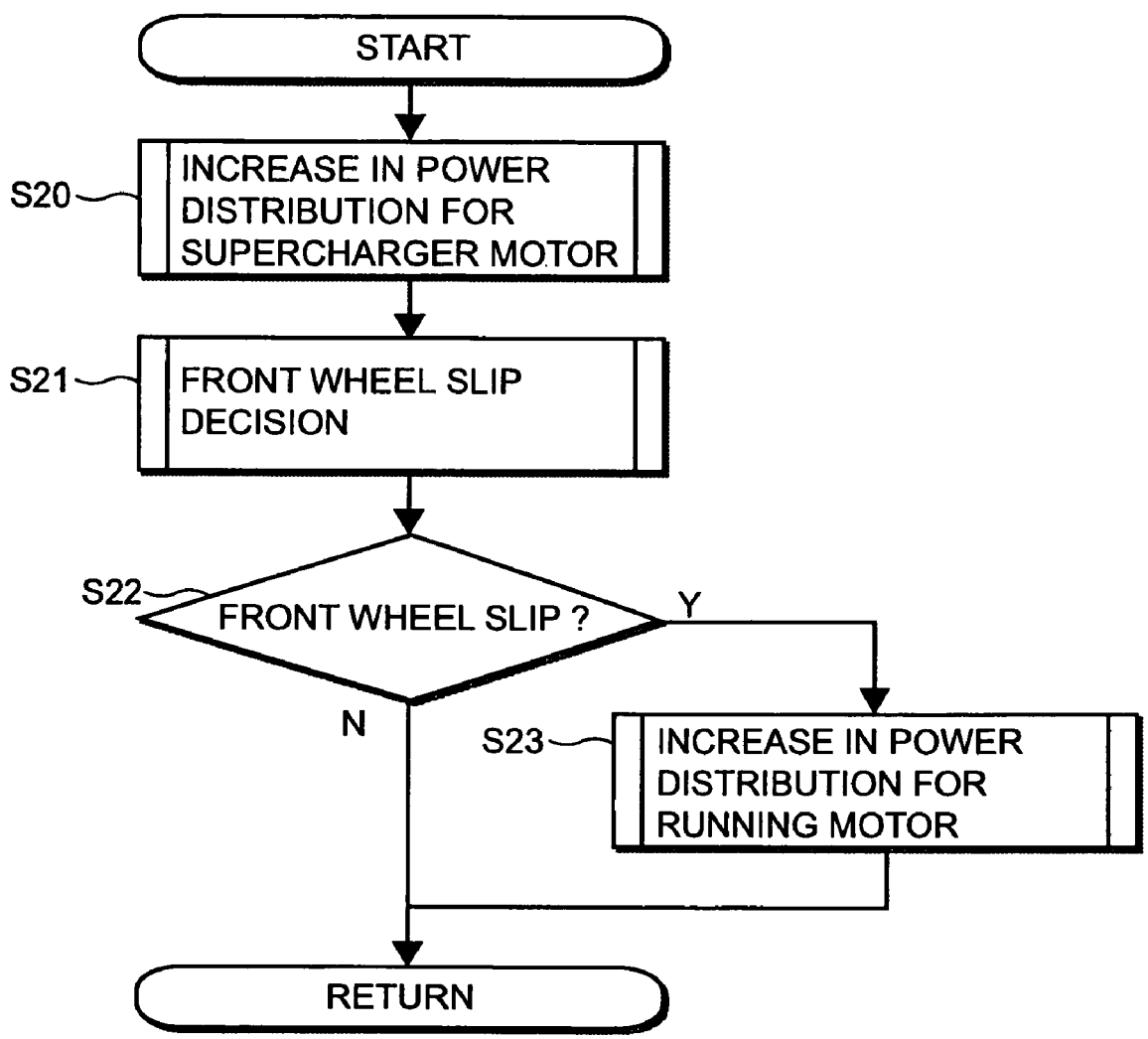
FIG. 6 is a flow chart of the control when the high μ road acceleration priority control mode is selected.

FIG. 6 shows the flow when the switch 4 selects the high μ road acceleration priority control mode at the position B. In this mode, in the initial state, the power distribution of the power distributor 12 is made larger for the supercharger driving motor 1b so as to increase the engine torque.

And, at Step S20 where the instruction value of the power distributor 12 is calculated, during continuation of the acceleration request, the power distribution to the supercharger driving motor 1b is increased and furthermore, the engine torque is increased, thus large acceleration is controlled so as to obtain.

However, when the engine torque is increased due to an increase in the output of the supercharger driving motor 1b, the front wheels 2 slip and the acceleration may be reduced.

To avoid it, at Step S21, the difference between the speed of the front wheels 2 and the rotational speed of the rear wheels 8 is obtained by subtraction, and when the difference in the rotational speed is larger than a predetermined value, it is decided that an excessive slip is generated, and the process goes to Step S23 from Step S22, and to decrease the torque supply to the front wheels 2, Step S23 for operating the wheel driving motor 14 for driving the rear wheels 8 is executed.

When the wheels do not slip, the process goes to Return from Step S22. By doing this, the slip of the front wheels 2 can be made extremely small by excessive engine torque and large acceleration can be obtained.

Figure 7:
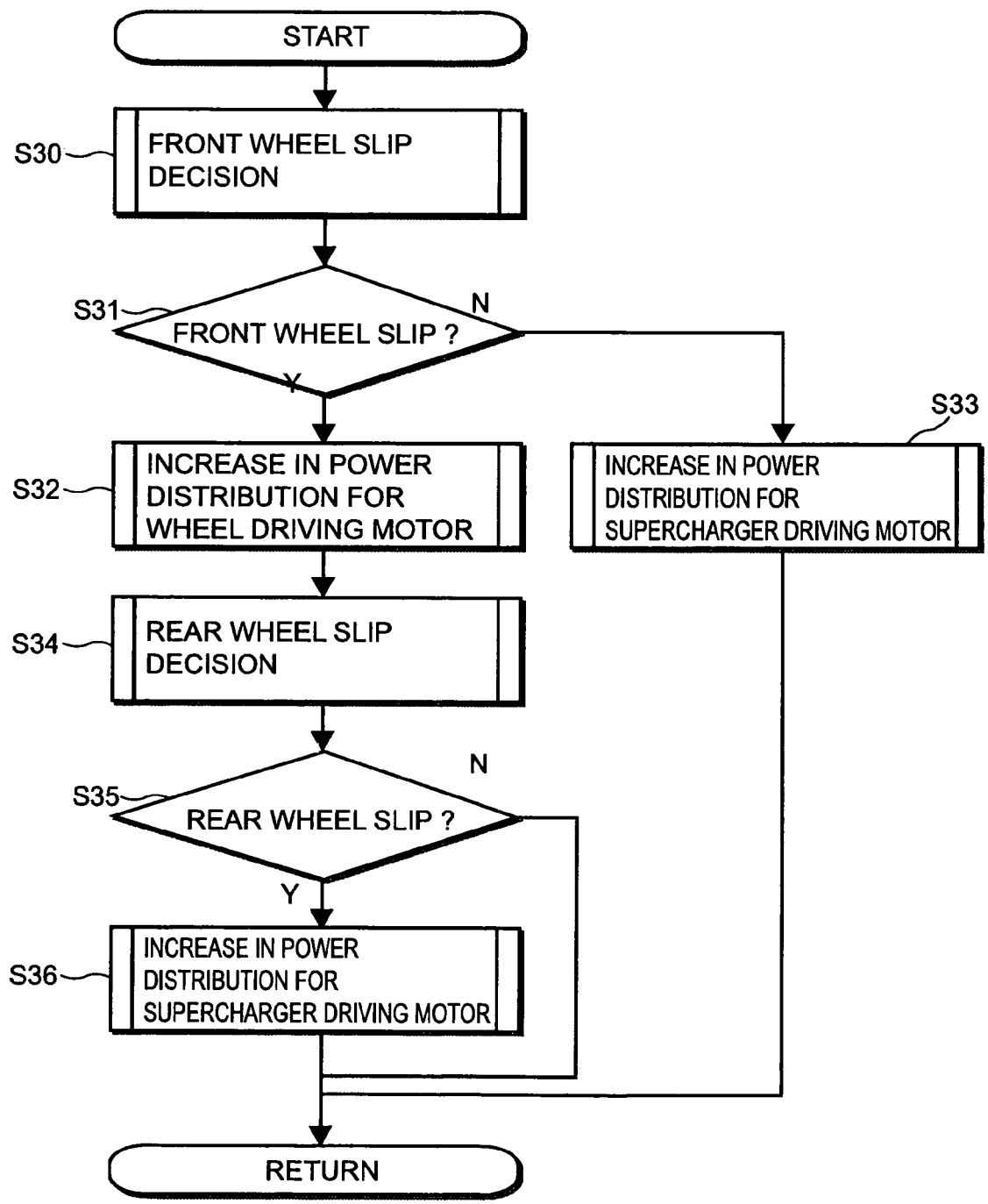
FIG. 7 is a flow chart of the control when the low μ road acceleration and running property priority mode is selected.

FIG. 7 shows the flow when the switch 4 selects the low μ road acceleration and running property priority mode at the position C.

In the low μ road acceleration and running property priority mode, in the initial state, to obtain the output of the motor 14 for driving the rear wheels 8, a method for setting the distribution of the power distributor 12 so as to supply power to both the supercharger motor 1b and the wheel driving motor 14 and changing the distribution ratio according to the slip status of the wheels is used.

When the running is started in the initial state and at Step S30, the slip of the front wheels 2 is decided to be excessive, Step S31 moves the process to Step S32 and the supply of the power to the wheel driving motor 14 is increased. Under this control, the power distribution to the wheel driving motor 14 is large originally, so that as a result of Step S32, there is the possibility that the rear wheels 8 driven by the motor 14 may slip.

Further, the slip of the rear wheels 8 is detected by a method for obtaining the acceleration on the basis of the wheel speed of the rear wheels 8 detected by the wheel speed sensors 3b and 3d and when it is larger than a preset threshold value, deciding that the wheels slip.

At Step S32, when the method is executed and the slip is excessive, the process goes to Step S36 from Step S35 to reduce the power to the rear wheel driving motor 14 and the power distribution to the supercharger motor 1b is increased. When the rear wheels 8 do not slip, the process goes to Return from Step S35 straight.

When the decision result at Step S30 shows that the front wheels 2 do not slip excessively, the process goes to Step S33 form Step S31, and the distribution to the supercharger driving motor 1b is increased, and the engine output is increased, thus the low μ road acceleration and running property is increased more.

Figure 8:
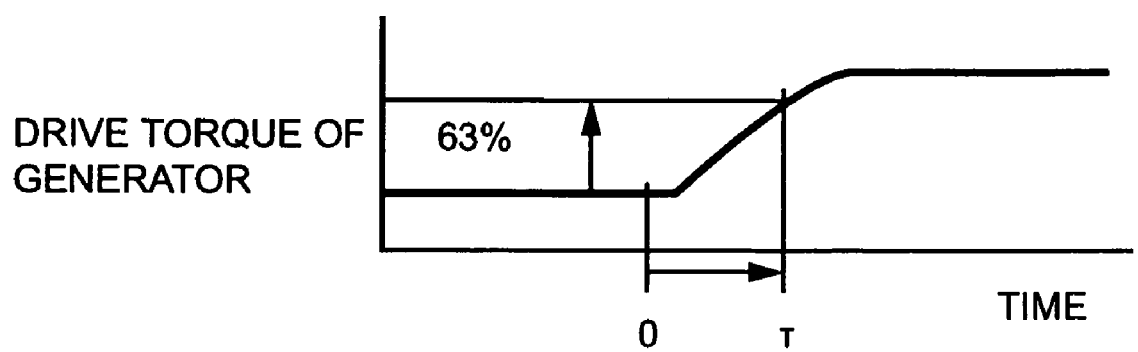
FIG. 8 is a drawing showing an example of a mechanical response of the generator.

FIGS. 8 to 11 show schematically the operation of the power distributor 12. FIG. 8 is a drawing showing changes in the drive torque of the generator when changing the output of the generator 10 from the supercharger driving motor 1b to the wheel driving motor 14 by the power distributor 12, that is, an example of mechanical response of the generator 10.

The power distributor 12 starts switching at the time 0 and the drive torque of the generator 10 is changed late. Here, the moment of switching is shown and 63% of the change of the drive torque is defined as a response time of τ.

Figure 9:
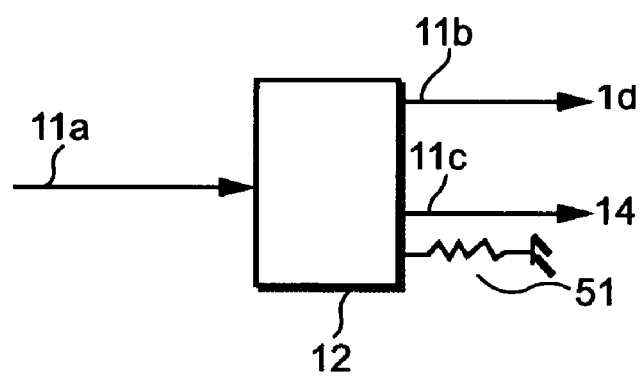
FIG. 9 is a drawing showing input and output of the power distributor 12.

FIG. 9 shows the input and output of the power distributor 12. The input is power from the generator 10, which is supplied by the power line 11a. The output is composed of three ways, and the first way is connected to the supercharger driving motor 1d via the power line 11b, and the second way is connected to the wheel driving motor 14 via the power line 11c, and the third way is connected to a resistor 51. The power distributor 12 switches and distributes the input power to the first to third outputs.

Figure 10:
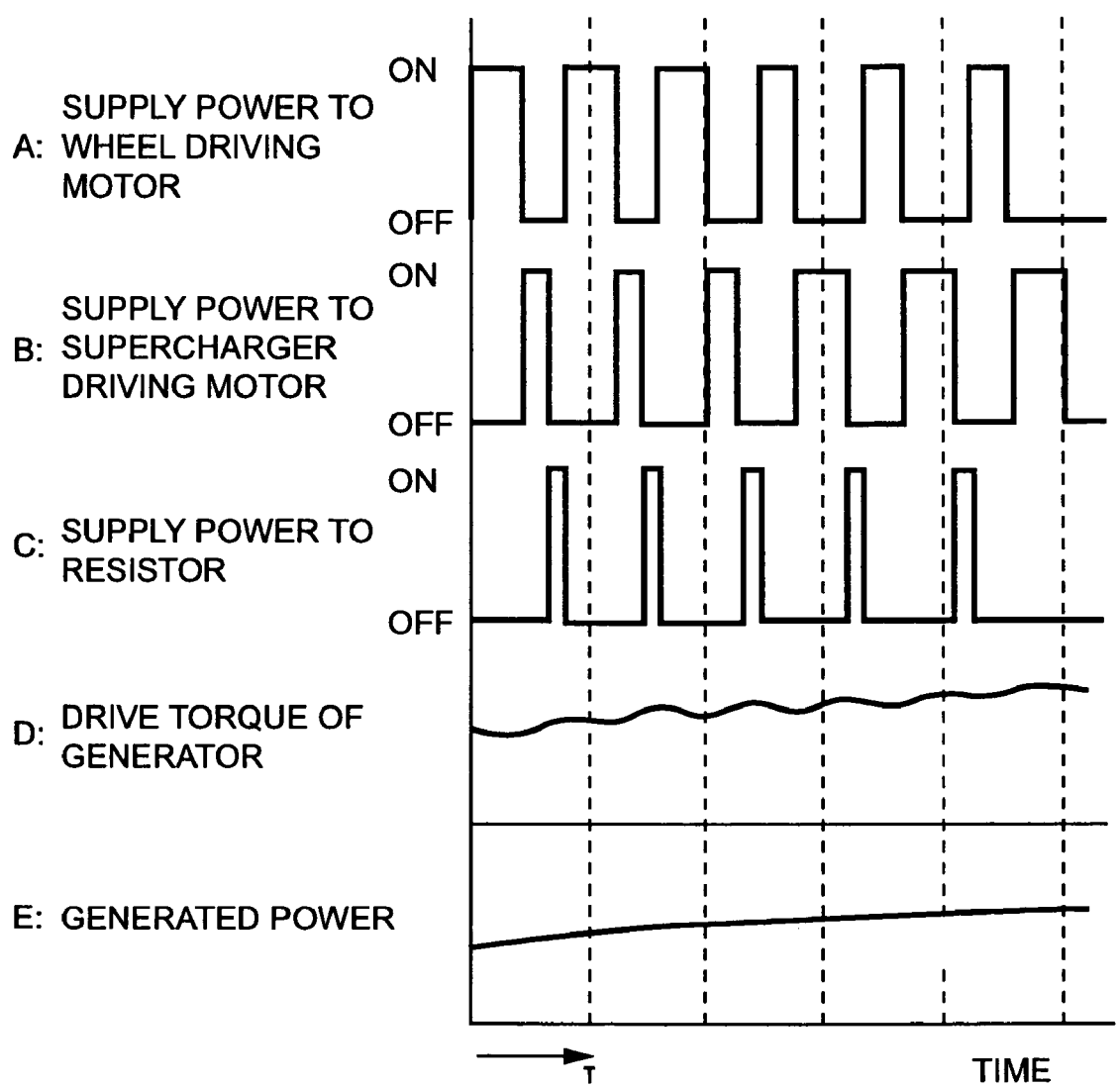
FIG. 10 is a drawing showing a suitable operation status of the distributor.

FIG. 10 is a drawing showing a suitable operation status of the distributor 12 and the power supply timings to the wheel driving motor 14, the supercharger driving motor 1b, and the resistor 51 are shown respectively as A, B, and C.

The drive torque of the generator 10 at that time is indicated as D and the generated power is indicated as E. Each dashed line indicates the time equivalent to the response time τ. In this embodiment, for each element connected to the distributor 12, the power supply time is switched within the range of time shorter than the response time τ indicated by the dashed line.

Therefore, as shown by D, the drive torque of the generator 10 changes little and simultaneously the generated power of the generator 10 changes little. To change the power distribution, it is desirable to control the power distributor 12 by the controller 7 so as to adjust the power supply time to each element.

However, to more reduce changes in the drive torque of the generator 10, it is preferable to more reduce the power supply time to each element and successively switch the elements.

On the other hand, to shorten the supply time, the circuit of the distributor 12 is increased in price, so that here, the supply time is limited to the response time τ capable of producing a sufficient effect.

Figure 11:
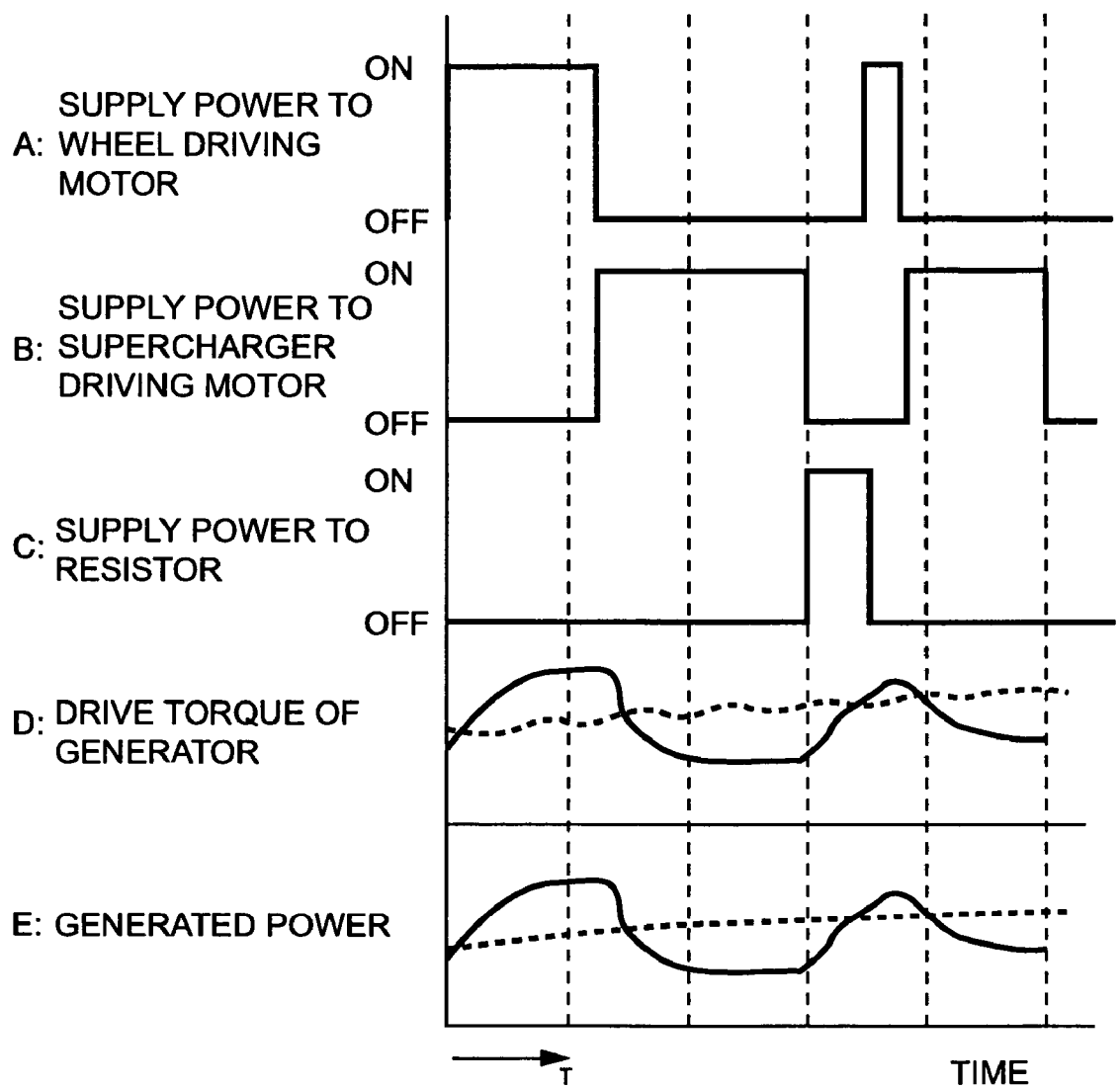
FIG. 11 is a drawing showing the operation status of the distributor.

For comparison, a case of power distribution from the power distributor 12 at intervals longer than the response time τ is shown in FIG. 11.

In this case, as shown by the solid line in D, the drive torque of the generator 10 is changed greatly compared with a case (the dashed line in D) of power distribution at intervals shorter than the response time τ, and deterioration of the durability of the belt of the pulley mechanism for driving the generator 10, noise, and vibration are caused, and the comfortableness to ride in is spoiled.

Further, although there is no input by the accelerator pedal sensor 5, when the controller 7, by a current sensor not shown in the drawing which is arranged on the power line 11c to the wheel driving motor 14, detects a current larger than a predetermined value, there is the possibility that the vehicle may be accelerated unintentionally and it is desirable to immediately stop the torque output of the wheel driving motor 14.

For that purpose, it is desirable to use the power distributor 12 and interrupt the power to the wheel driving motor 14. It is possible to set the current of the field coil 14a of the wheel driving motor 14 small by the controller 7.

However, the field coil 14a responds to power cut of the power distributor 12 late due to the coil inductance, so that when attempting to stop immediately the torque of the wheel driving motor 14, the power distributor 12 may be effectively used. The power distributor capable of actively distributing power as described in this embodiment can produce an effect of safety improvement.

As mentioned above, by use of the constitution and control method for the power distributor 12 indicated in the embodiment, a hybrid car having the three ensured properties such as the fuel consumption saving property, acceleration and running property on a low μ road, and acceleration on a high μ road can be realized.

By use of the aforementioned constitution to accomplish the first object, power is supplied to the supercharger motor and wheel driving motor by the single generator, so that space saving (miniaturization of the whole device) can be realized and the mountability in a vehicle is improved. At the same time, during running on a bad road, the supercharger motor is driven, thus the engine torque can be increased, so that the output of the wheel driving motor can be ensured stably. Therefore, there is no need to load a large battery and the vehicle can be lightened.

Furthermore, since the power distribution of the supercharger motor and wheel driving motor is made variable, when the output of the wheel driving motor is low, the power distribution to the supercharger motor can be reduced or stopped and even in a four-wheel driving state, an increase in fuel consumption can be suppressed.

When the four-wheel driving state is not required, the power distribution to the wheel driving motor is reduced or stopped, and the engine torque is increased by distributing the generated power to the supercharger motor, and the acceleration property of the vehicle on a μ road can be improved.

In a case of slow acceleration, the power distribution to both the wheel driving motor and supercharger motor is stopped, thus the efficiency can be avoided from reduction and fuel consumption can be maintained.

To accomplish the second object, when distributing the power to the two motors, the switching time is made shorter than the mechanical response speed of the generator, thus the mechanical input change of the generator is reduced, and the vibration of the engine and the mechanism connecting the generator and engine is reduced, and the comfortableness to ride in is improved, and the durability of the mechanism is improved.

When the aforementioned control method to accomplish the third object is executed, control suited to the acceleration and running property on a road easy to slip (low μ road) such as a frozen road, a snow road, or a muddy road or the acceleration property and fuel consumption saving property on a high μ road such as a dry asphalt road can be executed.

When the driver gives priority to the acceleration and running property on the low μ road by the switching operation, the power is distributed to both the wheel driving motor and supercharger motor by the power distributor to drive the four wheels.

Or, when he gives priority to the acceleration property on the high μ road, the power is distributed to the supercharger motor in priority by the power distributor and the torque generated by the engine is mostly transferred to the wheels driven by the engine.

Or, when he gives priority to the fuel consumption saving property, the power distribution can be controlled by using the distributor so as to reduce the power to the supercharger motor and wheel driving motor from the power distributor. As a result, an effect of easily obtaining the expected vehicle performance of the driver can be produced.

Further, when the wheels driven by the engine slip under the control by the distributor in a state that the output of the wheel driving motor is low, that is, when the rotational speed of the engine driven wheels is higher than the rotational speed of the other wheels, the power distribution to the wheel driving motor is increased by the power distributor, and the output of the supercharger driving motor is lowered, thus the engine output is reduced, and the slip of the engine driven wheels can be stopped immediately, and the deterioration of the acceleration property can be reduced.

Further, when the motor driven wheels slip in the four-wheel driving state by controlling the power distribution sent to each motor by the power distributor, that is, when the rotational speed of the motor driven wheels is higher than the rotational speed of the engine driven wheels, the power distribution to the motors is distributed to the supercharger, thus the output of the motor is reduced, and the slip of the motor driven wheels is suppressed, and the acceleration and running property on the low μ road can be maintained.

When the power distribution ratio to the wheel driving motor and supercharger motor is changed in accordance with the rotation state of the wheels like this, the acceleration and running property on the low μ road and the acceleration and running property on the high μ road can be made consistent with each other.

What is claimed is:

1. A method for controlling a hybrid car running by driving either of front wheels and rear wheels and a generator by an engine, driving a wheel driving motor by power of said generator, and driving wheels not driven by said engine, the method comprising the steps of:
   distributing said power generated by said generator to a supercharger motor for driving a supercharger installed in an air intake pipe of said engine and said wheel driving motor and
   controlling distribution amounts according to a running status.

2. A method for controlling a hybrid car according to claim 1, wherein when distributing said power to said supercharger motor and said wheel driving motor, said power is switched faster than a response time of a machine input change for a power load change of said generator with time.

3. A method for controlling a hybrid car according to claim 1, further comprising adjusting power distribution amounts to said supercharger motor and said wheel driving motor by a switching operation of a driver.

4. A method for controlling a hybrid car according to claim 1, further comprising increasing power distribution to said wheel driving motor when a rotational speed of said wheels driven by said engine is higher than a rotational speed of said wheels not driven by said engine.

5. A method for controlling a hybrid car according to claim 1, further comprising increasing power distribution to said supercharger motor when a rotational speed of said wheels driven by said wheel driving motor is higher than a rotational speed of said wheels driven by said engine.

6. A hybrid car running by driving either of front wheels and rear wheels and a generator by an engine, driving a wheel driving motor by power of said generator, and driving wheels not driven by said engine, comprising:
   a supercharger installed in an air intake pipe of said engine, a supercharger motor for driving said supercharger by said generator, a power distributor for distributing said power from said generator to said supercharger motor and said wheel driving motor, and a controller for inputting rotation information of said wheels and controlling power distribution of said power distributor.

7. A hybrid car according to claim 6, wherein said power distributor, when distributing said power to said supercharger motor and said wheel driving motor, switches said power faster than a response time of a machine input change for a power load change with time of said generator.

8. A hybrid car according to claim 6, wherein said controller adjusts power distribution amounts to said supercharger motor and said wheel driving motor by a switching operation of a driver.

9. A hybrid car according to claim 6, wherein said controller, when a rotational speed of said wheels driven by said engine is higher than a rotational speed of said wheels not driven by said engine, controls so as to increase said power distribution to said wheel driving motor.

10. A hybrid car according to claim 6, wherein said controller, when a rotational speed of said wheels driven by said wheel driving motor is higher than a rotational speed of said wheels driven by said engine, controls so as to increase said power distribution to said supercharger motor.

* * * * *